(12) United States Patent
Lin et al.

(10) Patent No.: US 6,719,436 B1
(45) Date of Patent: Apr. 13, 2004

(54) LED AREA-LIGHT SOURCE MODULE USED FOR LCD

(75) Inventors: Ching-Huang Lin, Penghu (TW); Yi-Hung Tsai, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/412,106

(22) Filed: Apr. 11, 2003

(51) Int. Cl.$^7$ ................................................. F21V 7/04
(52) U.S. Cl. ......................................... 362/31; 362/581
(58) Field of Search ........................... 362/31, 27, 581, 362/582

(56) References Cited

U.S. PATENT DOCUMENTS 6,036,328 A * 3/2000 Ohtsuki et al. ............... 362/31

FOREIGN PATENT DOCUMENTS

JP          7-74394     *   3/1995

* cited by examiner

*Primary Examiner*—David Vu
(74) *Attorney, Agent, or Firm*—Quintero Law Office (57) ABSTRACT

An LED area-light source module used for an LCD. A metal housing constituting a flat base, a bending portion, and at least one raised portion, in which the bending portion is an extension of the flat base and the overlapping portion between the bending portion and the flat base serves as a lying space. An LED circuit board is assembled into the lying space and has a plurality of chips, at least one connecting pad and at least one concave portion. An optical plate module is assembled on the flat base of the metal housing. At least one wire has one end welded on the connecting pad and the other end connected to a power supply. An edge between the exposed portion and the unexposed portion of the wire is installed on the bottom side of the concave portion.

8 Claims, 8 Drawing Sheets

LED AREA-LIGHT SOURCE MODULE USED FOR LCD

BACKGROUND OF THE INVENTION

1. Field of the Invention

The invention relates to an area-light source module used in a liquid crystal display (LCD), and more particularly to a light emitting diode (LED) area-light source module used in an LCD.

2. Description of the Related Art

A Liquid Crystal Display (LCD) constitutes an LC glass cell, a color filter, and an area-light source module. The LC glass cell is used to control the display of patterns or characters. The color filter is used to provide a color combination from R, G, and B light. The area-light source module is used to achieve the display effects of uniformity, high transparency, and wide viewing angle. In accordance with the type of LCD, the area-light source module is defined as a back-light source module and a front-light source module. The back-light source module is set in the rear of the LC glass cell and the color filter, and is mainly applied to a transparent type LCD. The front-light source module is set in front of the LC glass cell and the color filter, and is mainly applied to a reflective type LCD or a transflective type LCD. The light source of the area-light source module includes a cold cathode fluorescent lamp (CCFL) serving as a linear light source, and a light emitting diode (LED) served as a point light source. The LED has advantages of low power consumption, long useful life and low cost, thus the LED area-light source module is popularly applied to middle-size LCDs and small-size LCDs in portable electronic products.

Figure 1:
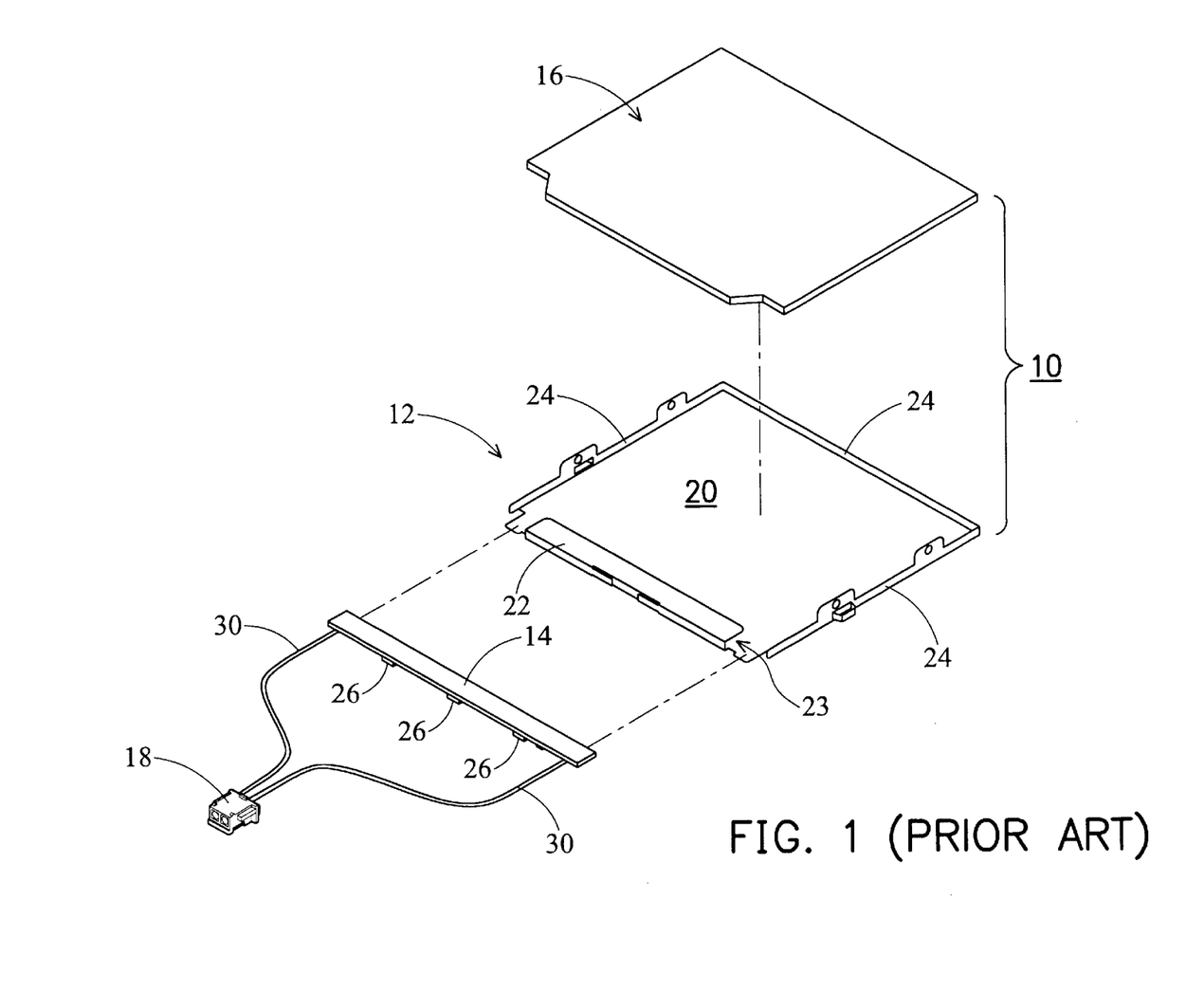
FIG. 1 is an exploded view showing a conventional LED area-light source module.

FIG. 1 is an exploded view showing a conventional LED area-light source module. An LED area-light source module 10 comprises a metal housing 12, an LED circuit board 14, an optical plate module 16 and a power supply 18. The metal housing 12 in constituting a flat base 20, a bending portion 22 and three raised portions 24. The bending portion 22 is an extension of one side of the flat base 20 and provides a lying space 23 therebetween for setting the LED circuit board 14, and the three raised portions 24 respectively protrude from the other sides of the flat base 20. The LED circuit board 14 comprises a plurality of LED chips 26 which are electrically connected to the power supply 18 through at least two wires 30. The optical plate module 16 comprises at least one light-guiding plate, at least one reflective plate and at least one diffusion plate to improve the intensity and uniformity of the area-light source and provide specific optical characteristics.

Figure 2:
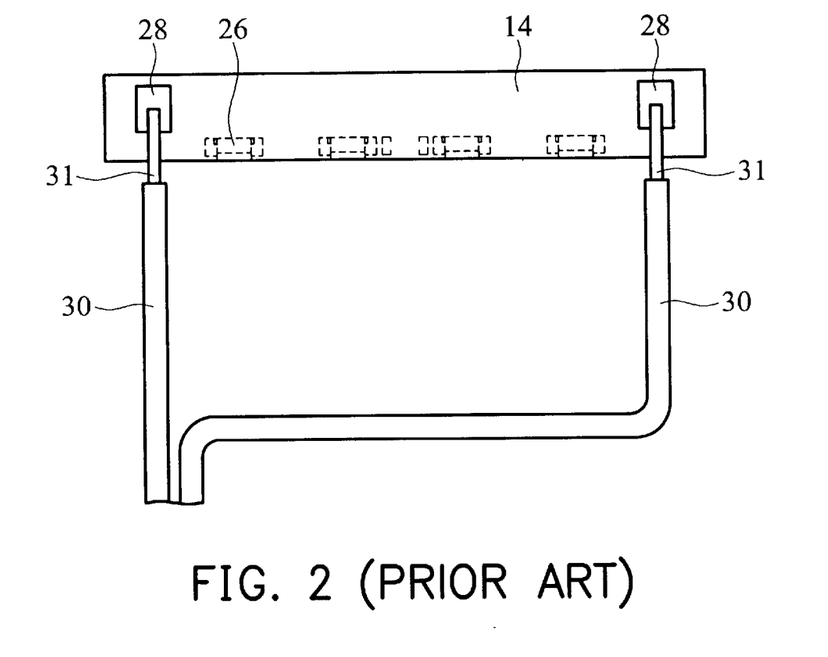
FIG. 2 is a top view of the LED circuit board shown in FIG. 1.

FIG. 2 is a top view of the LED circuit board 14 shown in FIG. 1. For electrically connecting the LED circuit board 14 to the power supply 18, one end of the wire 30 is welded to a connecting pad 28 on the LED circuit board 14, and the other end of the wire 30 is connected to the power supply 18. However, since the profile of the LED circuit board 14 is rectangular and the sidewall of the LED circuit board 14 adjacent to the connecting pad 28 is a faceted face, the exposed portion 31 of the wire 30 is exposed and can easy cause a short circuit.

Figure 3:
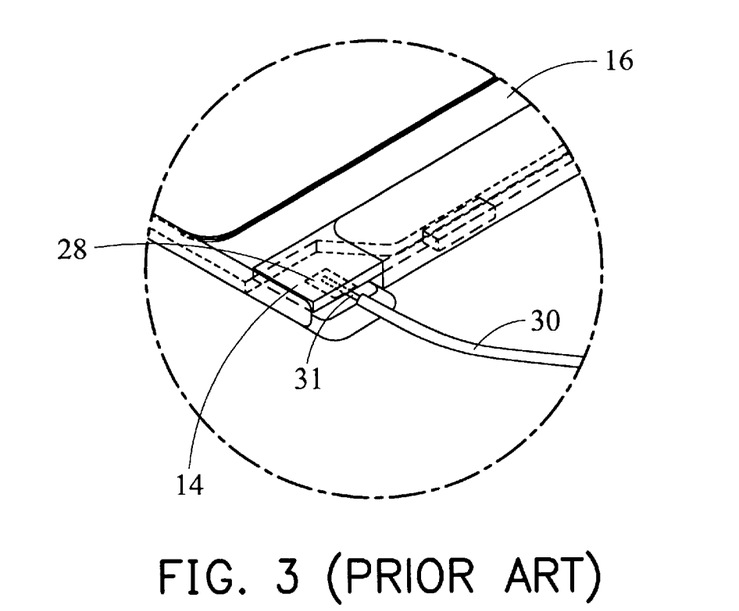
FIG. 3 is a partially enlarged view showing an assembled structure including the metal housing, the LED circuit board and the wires shown in FIG. 1.

FIG. 3 is a partially enlarged view showing an assembled structure including the metal housing 12, the LED circuit board 14 and the wires 30 shown in FIG. 1. In assembling the LED area-light source module, one end of the wire 30 is welded on the connecting pad 28 of the LED circuit board 14, and then the LED circuit board 14 is placed into the lying space 23 of the metal housing 12, and then the optical plate module 16 is stacked on the flat base 20 of the metal housing 12. However, during placement of the LED circuit board 14, it is easy to pull or drag the wire 30 due to the limitation of the lying space 23. Thus, the exposed portion 31 of the wire 31 may contact the adjacent metal housing 12, such as the flat base 20, the bending portion 22 and the raised portions 24, resulting in a short circuit.

SUMMARY OF THE INVENTION

Accordingly, an object of the invention is to provide an LED area-light source module used in an LCD to solve the short circuit caused by contact between the exposed wire and the metal housing in the prior art.

To achieve these and other advantages, the invention provides an LED area-light source module used in an LCD. A metal housing constituting a flat base, a bending portion, and at least one raised portion, in which the bending portion is an extension of the flat base and the overlapping portion between the bending portion and the flat base serves as a lying space. An LED circuit board is assembled into the lying space and has a plurality of chips, at least one connecting pad and at least one concave portion. The concave portion is formed at one rim of the LED circuit board and adjacent to the connecting pad. The concave portion constituting a bottom side and two sidewalls, and the bottom side is adjacent to the connecting pad. An optical plate module is assembled on the flat base of the metal housing. At least one wire has one end welded on the connecting pad and the other end connected to a power supply. An edge between the exposed portion and the unexposed portion of the wire is installed on the bottom side of the concave portion.

DESCRIPTION OF THE DRAWINGS

For a better understanding of the present invention, reference is made to a detailed description to be read in conjunction with the accompanying drawings, in which.

DETAILED DESCRIPTION OF THE INVENTION

First Embodiment

Figure 4:
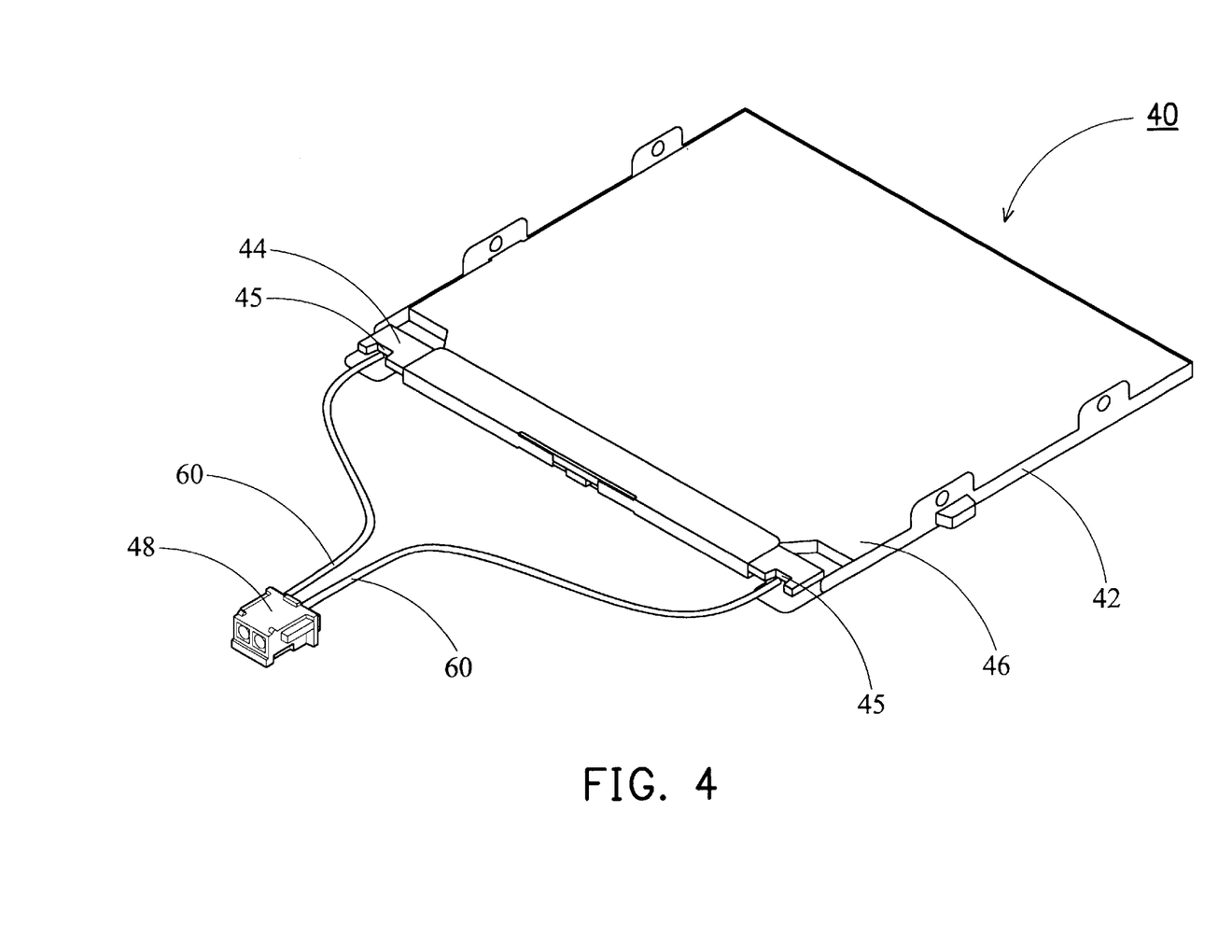
FIG. 4 is a solid view of an LED area-light source module according the first embodiment of the present invention.
Figure 5:
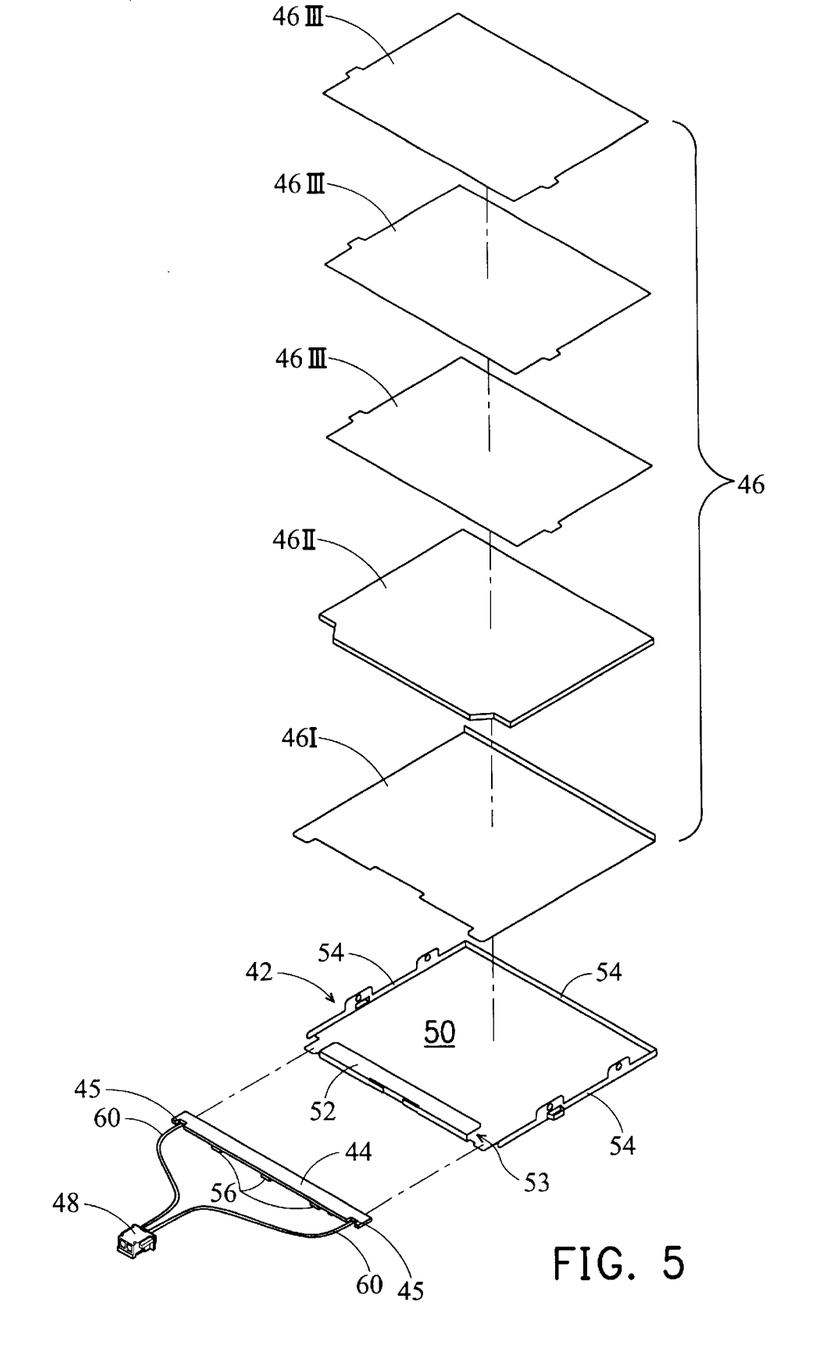
FIG. 5 is an exploded view an LED area-light source module according the first embodiment of the present invention.

FIG. 4 is a solid view of an LED area-light source module according the first embodiment of the present invention. FIG. 5 is an exploded view an LED area-light source module according the first embodiment of the present invention.

An LED area-light source module 40 comprises a metal housing 42, an LED circuit board 44, an optical plate module 46, a power supply 48 and two wires 60. The metal housing 42 constituting a flat base 50, a bending portion 52 and three raised portions 54. The bending portion 52 is an extension of one side of the flat base 50 and the overlapping portion therebetween provides a lying space 53 for installing the LED circuit board 44. The three raised portions 54 respectively protrude from the other sides of the flat base 50. The LED circuit board 44 comprises a plurality of LED chips 56 and two concave portions 45, and the two wires 60 are welded on the LED circuit board 44 adjacent to the concave portions 45 respectively, thus providing electrical connection to the power supply 48. The optical plate module 46 is a stack of a reflective plate 46I, a light-guiding plate 46II and a plurality of diffusion plates 46III to provide transformation and uniformity of the light source and specific optical characteristics.

Figure 6A:
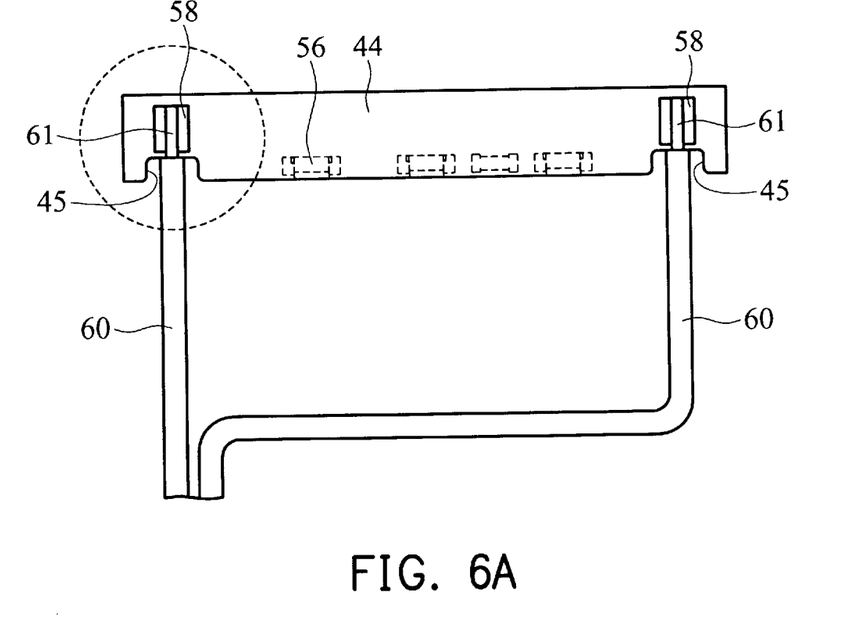
FIG. 6A is a top view of the LED circuit board shown in FIG. 5.
Figure 6B:
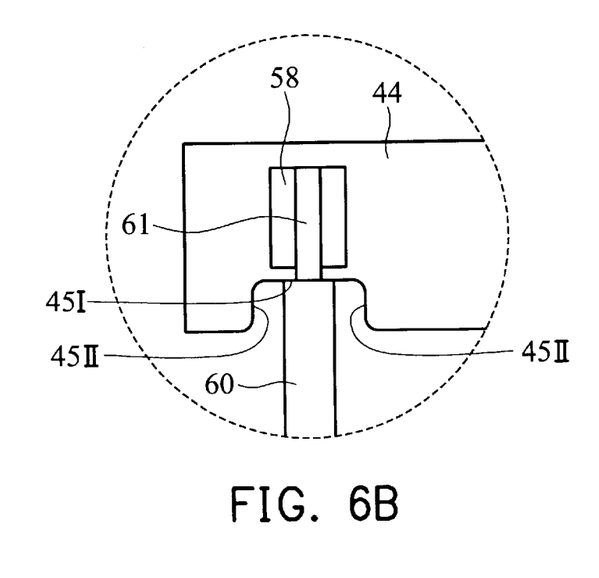
FIG. 6B is a partially enlarged view of the connection between the LED circuit board and the wire shown in FIG. 6A.

FIG. 6A is a top view of the LED circuit board 44 shown in FIG. 5. FIG. 6B is a partially enlarged view of the connection between the LED circuit board 44 and the wire 60 shown in FIG. 6A.

For electrically connecting the LED circuit board 44 to the power supply 48, one end of the wire 60 is welded to a connecting pad 58 on the LED circuit board 44, and the other end of the wire 60 is connected to the power supply 48. Preferably, the two concave portions 45 are formed adjacent to the two connecting pads 58 and outside the lying space 53, and the concave portion 45 constituting a linear bottom side 45I and two curved sidewalls 45II. There is no limit in the size of the concave portion 45, the symmetry of the curved sidewalls 45II and the style of the curved sidewall 45II. The exposed portion 61 of the wire 60 is almost fully welded within the connecting pad 58 and the edge between the exposed portion 61 and the unexposed portion of the wire 60 can be installed on the linear bottom side 45I of the concave portion 45, thus the exposed portion 61 cannot be suspended in the space outside the LED circuit board 44.

Figure 7:
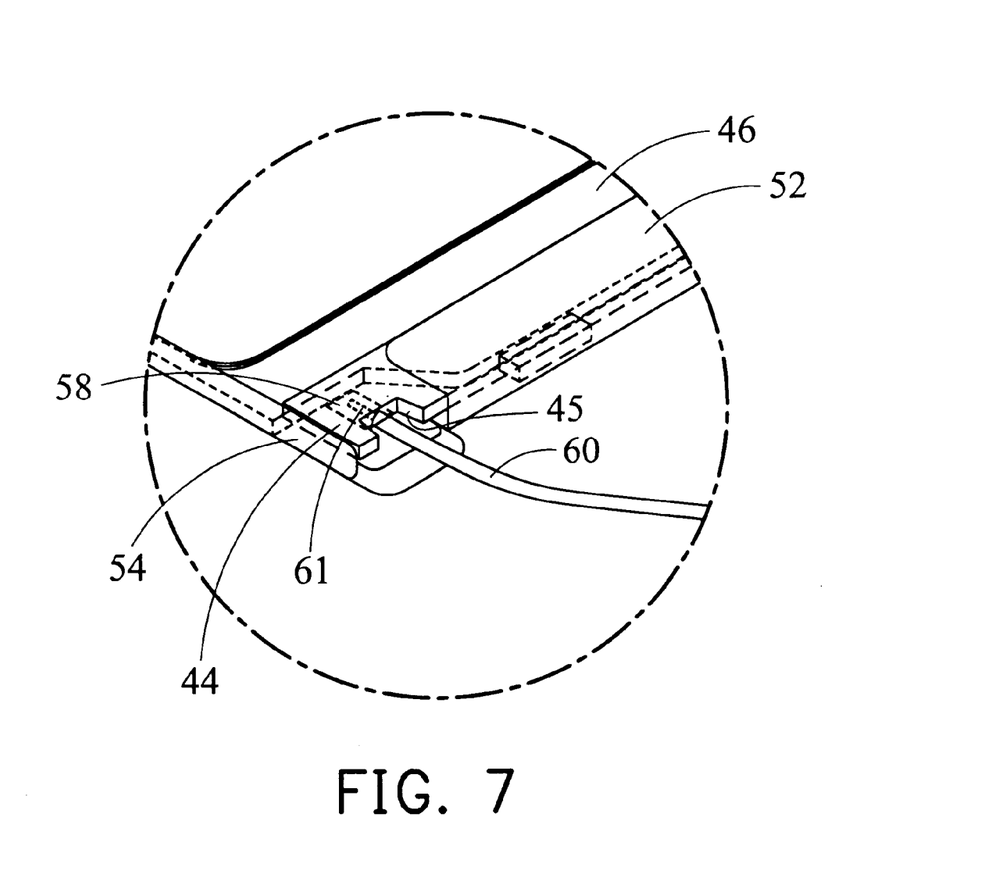
FIG. 7 is a partially enlarged view showing an assembled structure including the metal housing, the LED circuit board and the wires shown in FIG. 4.

FIG. 7 is a partially enlarged view showing an assembled structure including the metal housing 42, the LED circuit board 44 and the wires 60 shown in FIG. 4. In assembling the LED area-light source module 40, one end of the wire 60 is welded on the connecting pad 58 of the LED circuit board 44, and then the LED circuit board 44 is placed into the lying space 53 of the metal housing 42, and then the optical plate module 46 is stacked on the flat base 50 of the metal housing 42. However, during placement of the LED circuit board 44, it is easy to pull or drag the wire 60 due to the limited lying space 53. The present invention provides the concave portion 45 adjacent to the connecting pad 58 to avoid the exposed portion 61 of the wire 60 being suspended outside the LED circuit board 44. Although the wire 60 may be pulled or dragged during placement of the LED circuit board 44 into the lying space 53, the concave portion 45 keeps the exposed portion 61 of the wire 60 apart from the adjacent metal housing 42 at a reliable distance to prevent a short circuit from electrical connection between the exposed portion 61 and the metal housing 42.

Second Embodiment

The second embodiment of the present invention provides an LED area-light source module in which most of the elements and the assembling method are similar to the LED area-light source module 40 shown in the first embodiment except for the profile of the concave portion. The second embodiment provides a first modified profile for the concave portion on the LED circuit board to achieve the same advantages described in the first embodiment.

Figure 8A:
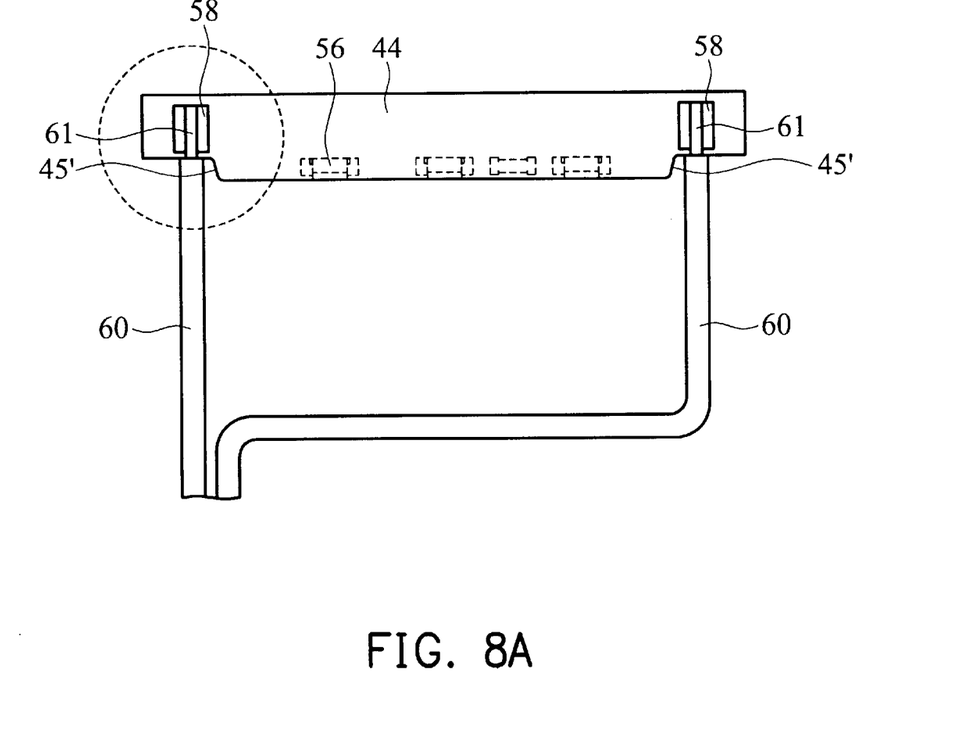
FIG. 8A is a top view of the LED circuit board according to the second embodiment of the present invention.
Figure 8B:
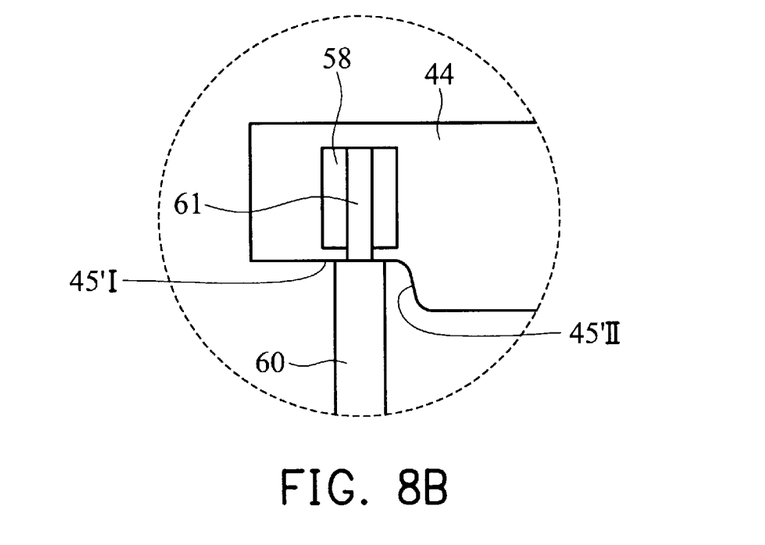
FIG. 8B is a partially enlarged view of the connection between the LED circuit board and the wire shown in FIG. 8A.

FIG. 8A is a top view of the LED circuit board 44 according to the second embodiment of the present invention. FIG. 8B is a partially enlarged view of the connection between the LED circuit board 44 and the wire 60 shown in FIG. 8A.

The LED circuit board 44 comprises two concave portions 45' adjacent to the two connecting pads 58. Preferably, the concave portion 45' constituting a linear bottom side 45'I and a curved sidewall 45'II, and the curved portion 45'II is adjacent to the bending portion of the metal housing 42. There is no limit to the size of the concave portion 45' and the curved style of the curved sidewall 45'II. The exposed portion 61 of the wire 60 is almost fully welded within the connecting pad 58 and the edge between the exposed portion 61 and the unexposed portion of the wire 60 can be installed on the linear bottom side 45'I of the concave portion 45', thus the exposed portion 61 cannot be suspended in the space outside the LED circuit board 44. Although the wire 60 may be pulled or dragged during placement of the LED circuit board 44 into the lying space 53, the concave portion 45' keeps the exposed portion 61 of the wire 60 apart from the adjacent metal housing 42 at a reliable distance to prevent a short circuit from electrical connection between the exposed portion 61 and the metal housing 42.

Third Embodiment

The third embodiment of the present invention provides an LED area-light source module in which most of the elements and the assembling method are similar to the LED area-light source module 40 shown in the first embodiment except for the profile of the concave portion. The third embodiment provides a second modified profile and a third modified profile for the concave portion on the LED circuit board to achieve the same advantages described in the first embodiment. Preferably, in the second modified profile, the two curved sidewalls 45II described in the first embodiment are modified as two bevel sidewalls. In the third modified profile, the curved sidewall 45'II described in the second embodiment is modified as a bevel sidewall.

Figure 9A:
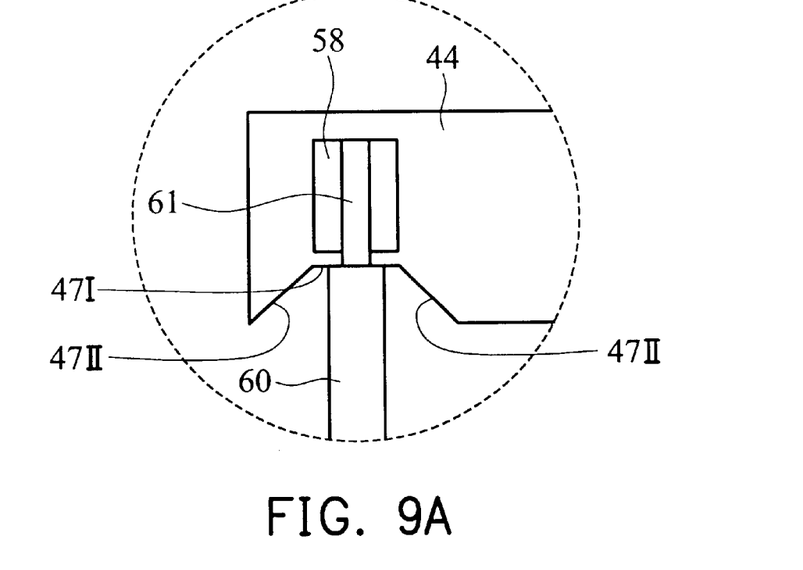
FIG. 9A is a partially enlarged view of a second modified profile of the concave portion according to the third embodiment.

FIG. 9A is a partially enlarged view of a second modified profile of the concave portion according to the third embodiment. The LED circuit board 44 comprises two concave portions 47 adjacent to the two connecting pads 58 respectively. Preferably, the concave portion 47 constituting a transverse-linear bottom side 47I and two bevel sidewalls 47II. There is no limit to the size of the concave portion 47, the symmetry of the bevel sidewalls 47II and the inclination of the bevel sidewall 47II.

Figure 9B:
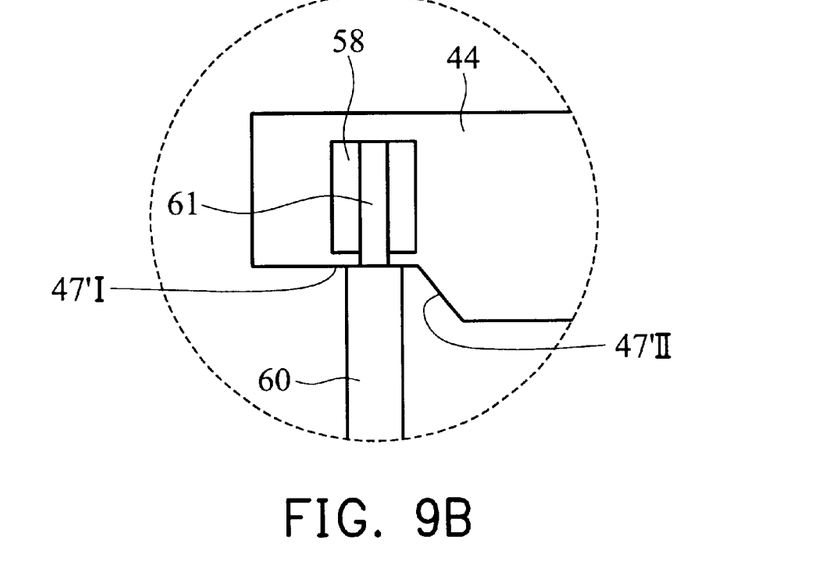
FIG. 9B is a partially enlarged view of a third modified profile of the concave portion according to the third embodiment.

FIG. 9B is a partially enlarged view of a third modified profile of the concave portion according to the third embodiment. The LED circuit board 44 comprises two concave portions 47' adjacent to the two connecting pads 58 respectively. Preferably, the concave portion 47' constituting a transverse-linear bottom side 47'I and a bevel sidewall 47'II. There is no limit to the size of the concave portion 47' and the inclination of the bevel sidewall 47'II.

By providing the concave portion 47 or 47', the exposed portion 61 of the wire 60 is almost fully welded within the connecting pad 58 and the edge between the exposed portion 61 and the unexposed portion of the wire 60 can be installed on the transverse-linear bottom side 47I or 47'I of the concave portion 47 and 47', thus the exposed portion 61 cannot be suspended in the space outside the LED circuit board 44. Although the wire 60 may be pulled or dragged during placement of the LED circuit board 44 into the lying space 53, the concave portion 47 or 47' keeps the exposed portion 61 of the wire 60 apart from the adjacent metal housing 42 at a reliable distance to prevent a short circuit from electrical connection between the exposed portion 61 and the metal housing 42.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. An LED area-light source module used in an LCD, comprising:

a metal housing constituting a flat base, a bending portion, and at least one raised portion, in which the bending portion is an extension of the flat base and the overlapping portion between the bending portion and the flat base, serves as a lying space;

an LED circuit board assembled into the lying space and comprising a plurality of chips, at least one connecting pad and at least one concave portion, in which the concave portion is formed at one rim of the LED circuit board and adjacent to the connecting pad, the concave portion constituting a bottom side and two sidewalls, and the bottom side is adjacent to the connecting pad;

an optical plate module assembled on the flat base of the metal housing;

a power supply; and at least one wire, in which one end of the wire is welded to the connecting pad and the other end of the wire is connected to the power supply;

wherein, an edge between the exposed portion and the unexposed portion of the wire is installed on the bottom side of the concave portion.

2. The LED area-light source module used in an LCD as claimed in claim 1, wherein the concave portion comprises a linear bottom side and two curved sidewalls.

3. The LED area-light source module used in an LCD as claimed in claim 1, wherein the concave portion comprises a linear bottom side and two bevel sidewalls.

4. The LED area-light source module used in an LCD as claimed in claim 1, wherein the concave portion comprises a linear bottom side and one curved sidewall, and the curved sidewall is adjacent to the bending portion of the metal housing.

5. The LED area-light source module used in an LCD as claimed in claim 1, wherein the concave portion comprises a linear bottom side and one bevel sidewall, and the bevel sidewall is adjacent to the bending portion of the metal housing.

6. The LED area-light source module used in an LCD as claimed in claim 1, wherein the concave portion of the LED circuit board is outside the lying space between the bending portion and the flat base.

7. The LED area-light source module used in an LCD as claimed in claim 1, wherein the optical plate module comprises at least one reflective plate, at least one light-guiding plate and at least one diffusion plate.

8. The LED area-light source module used in an LCD as claimed in claim 1, wherein the metal housing comprises three raised portions protruding from the other three sides of the flat base.

\* \* \* \* \*